S. B. MAULSBY.

Evaporating Pan.

No. 63,545.

Patented April 2, 1867.

Witnesses:

Inventor:

United States Patent Office.

SILAS B. MAULSBY, OF MUNCIE, INDIANA.

Letters Patent No. 63,545, dated April 2, 1867.

---

IMPROVED SUGAR-JUICE EVAPORATOR.

---

*The Schedule referred to in these Letters Patent and making part of the same.*

---

TO ALL WHOM IT MAY CONCERN:

Be it known that I, SILAS B. MAULSBY, of Muncie, Delaware county, State of Indiana, have invented certain new and useful improvements on the "Improved Evaporator" patented by me on the twenty-fourth day of July, 1866; and I do hereby declare that the following is a clear, full, and exact description of the same, reference being had to the accompanying drawings, of which—

Figure 1 represents a top view.

Figure 2, a longitudinal section.

Figure 3, detailed sections of pan A.

Figure 1:
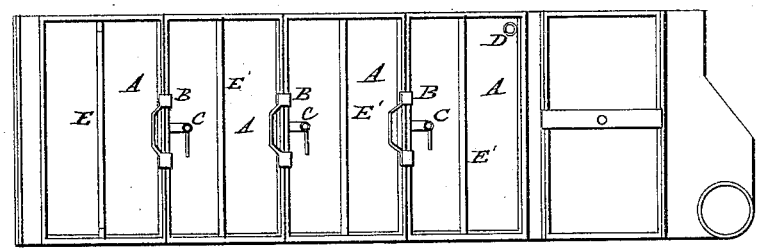
Figure 2:
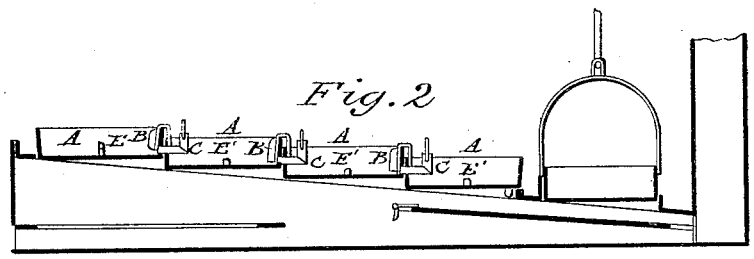
Figure 3:
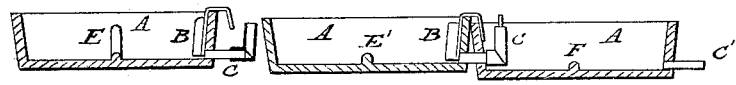
Figure 4:
Figures 4 and 5 are sections of pan A.
Figure 5:
Figure 6:
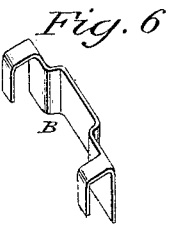
Figure 6 represents the strainer gate and fastener.
Figure 7:
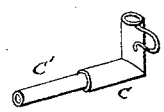
Figure 7 represents a connecting tube.

My improvements consist in putting into each pan a tube, C, by means of which the juice passes from one pan into the other. These tubes are in two parts, and provided with a handle, so that the running of the juice can be stopped whenever wanted by turning the end of this pipe up. This tube is placed into the pans a little above the bottom, so as to prevent the sediment from passing into it; and also in applying a strainer gate, B, to the pans, which also helps to hold the pans together. By means of this strainer gate I keep all the skim from passing into the tube C. This gate is provided with a wire cloth, to prevent any impure juice from passing.

A represents the pans, B represents the strainer gate, C represents the tube, D is a hole for the sirup to run out, E represents the ribs of the pans.

I put the green juice into the highest pan, and boil it. From there it runs through the tube C into the next lower one, and from that to the next lower one, and so forth, until it reaches the finishing pan. If wanted, the juice may be stopped in any one of the pans by turning the respective tube end upwards.

With this method I can make much finer and superior sirup, as I strain the sirup in every pan, prevent the sediment from passing along, and also the skim.

What I claim, and desire to secure by Letters Patent of the United States, is—

1. The strainer gate B, constructed as herein described and represented, and employed to connect the pans together, as well as to arrest the passage of the scum, as set forth.

2. The adjustable elbow tube C, applied and operating in combination with the pans A in the manner and for the purpose set forth.

SILAS B. MAULSBY.

Witnesses:
HENRY R. HUEBNER,
JAS. WM. LOEPER.